Feb. 6, 1951
C. E. HEMMINGER
2,540,581
METHOD OF MAKING GASOLINE
Filed Sept. 18, 1946
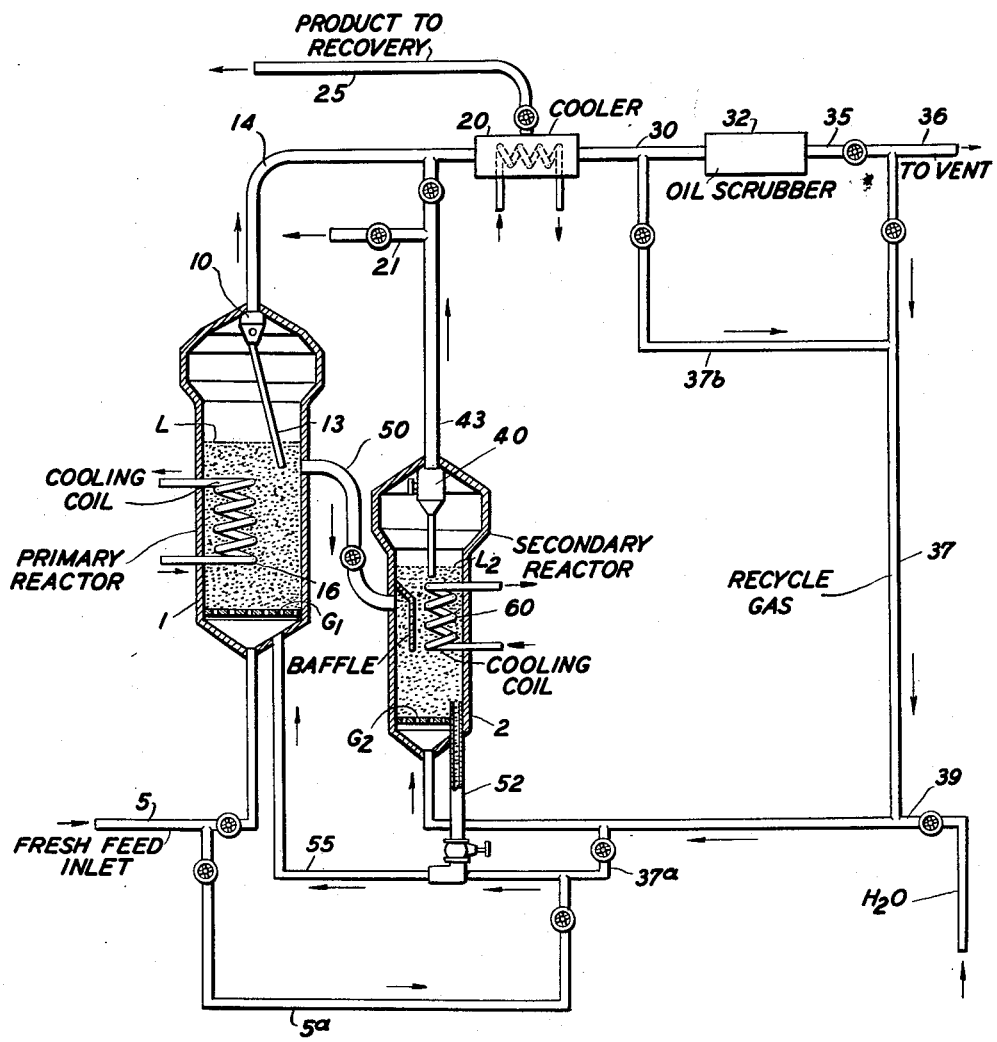
INVENTOR:
CHARLES E. HEMMINGER
BY J. Cashman
ATTORNEY.

Patented Feb. 6, 1951

2,540,581

UNITED STATES PATENT OFFICE 2,540,581

METHOD OF MAKING GASOLINE

Charles E. Hemminger, Westfield, N. J., assignor to Standard Oil Development Company, a corporation of Delaware Application September 18, 1946, Serial No. 697,807

3 Claims. (Cl. 260—449.6)

The present invention relates to improvements in the art of synthesizing hydrocarbons and oxygenated hydrocarbons and, more particularly, it relates to a method of carrying out a hydrocarbon synthesis reaction by reacting carbon monoxide and hydrogen so as to obtain maximum utilization of reactants and minimum formation of carbonaceous deposits on the catalyst.

Prior to my invention it was known that hydrocarbons and oxygenated hydrocarbons could be formed by reacting together carbon monoxide and hydrogen in the presence of a suitable catalyst. An early process in this field was known as the Fischer-Tropsch reaction. In the Fischer-Tropsch reaction the catalyst generally employed was cobalt carried on kieselguhr and activated with thoria. Subsequently, a modification of this process was developed in which the catalyst used was iron. In the iron catalyst method the temperatures and pressures were somewhat higher than in the earlier Fischer-Tropsch process. The earlier commercial processes for manufacturing hydrocarbons synthetically from carbon monoxide and hydrogen in the presence of a catalyst were carried out in a reactor containing a bed (or beds) of stationary catalyst. More recently, research has been directed toward carrying out the hydrocarbon synthesis in what has come to be known as the "fluid catalyst" type of operation. At the present time, there are disclosed in patents and publications fluid catalyst methods for synthesizing hydrocarbons and oxygenated hydrocarbons from carbon monoxide and hydrogen. These disclosures have been of a very superficial nature, frequently devoid of any mention of critically significant variables, having confined their teachings to a broad, general discussion of the usual temperature, pressure and time relationships. While a result may be obtained by following such incomplete teachings, it has been found that the results are so uncertain in kind and extent and of such doubtful economy as to be of no real practical value to industry. In the process of the present invention operating variables are carefully co-ordinated during the synthesis of hydrocarbons to give improved results.

The catalyst of the present invention is preferably powdered iron, although cobalt may be used. The iron catalyst may, for example, be formed by roasting spent pyrites catalyst and subsequently reducing the same in a hydrogen atmosphere. Another good catalyst is one which is an essentially pure form of iron oxide, which oxide is fused with various promoters such as potassium salts, with the further addition of alumina, and then subsequently cooled, ground, and reduced in an atmosphere of hydrogen. This catalyst for use in a fluid reactor is ground to a particle size of from 20 to 80 microns with about 25 per cent within the range of from 0 to 20 microns.

An important object of my present invention is to carry out the hydrocarbon synthesis reaction so as to obtain maximum utilization of the reactants, carbon monoxide and hydrogen.

Another equally important object of my invention is to carry out the hydrocarbon synthesis reaction under conditions such that the formation of carbonaceous deposits on the catalyst employed are substantially repressed.

Other and further objects of my invention will appear from the following description and the appended claims.

In general, I carry out the hydrocarbon synthesis in an operation which is essentially a two-stage process in which the major part of the synthesis takes place in the first stage at lower temperatures and a lower hydrogen to carbon monoxide ratio than employed in the second stage. The synthesis in the second stage takes place, as stated, with a high hydrogen to carbon monoxide ratio and this not only has the effect of providing control over the carbon content of the catalyst but also converts a considerable amount of carbon dioxide to hydrocarbon products and water due to the water gas shift reaction. Consequently, there is less carbon dioxide and hydrogen remaining in the exit gas from the second stage, decreasing the volume of gas to the absorption equipment, and giving a higher yield of liquid products based on the feed gas. The gas feed to the second stage may or may not be gasiform material from which the lighter hydrocarbons are removed by absorption, all of which will appear more fully hereinafter.

In the accompanying drawing, I have shown diagrammatically a form of apparatus in which a preferred modification of my invention may be carried into effect.

Referring in detail to the drawing, 1 represents a primary reactor containing a fluidized mass of powdered catalyst C and 2 is a secondary reactor. The fresh feed enters the present system through a line 5 and contains hydrogen, carbon monoxide and a small amount of carbon dioxide, the ratio of hydrogen to carbon monoxide ranging from 1 to 2 mols of hydrogen per mol of carbon monoxide with 1.5 mols of hydrogen per mol of carbon monoxide preferred. The gaseous reactants are forced into the bottom of reactor 1, as shown, and thence passed upwardly through a screen or grid G into a mass of fluidized catalyst which, in the drawing, extends in dense phase suspension from G to L, the level L being known commonly in this type of reactor as the upper dense phase level. The catalyst is maintained in the fluidized form or the dense, turbulent suspension mentioned by controlling the superficial velocity of the gases passing upwardly through reactor 1 within the range of, say, ¼ to 1½ feet per second. Above the level L which is fixed by the amount of catalyst actually present in the reactor, as well as the superficial velocity of the gasiform material, there is an upper dilute phase suspension of catalyst in gasiform material, the concentration of which decreases sharply from the level L to the top of the reactor. In other words, the space from the level L to the top of the reactor is commonly referred to as the catalyst disengaging space, wherein the suspended catalyst tends to separate by gravity out of the gases and/or vapors and descend into or toward the dense phase suspension. The dense phase suspension using powdered iron catalyst of the particle size mentioned and employing the gas velocities mentioned will have a density of 40 to 120 pounds per cubic foot. Ordinarily, in the upper portion of the reactor there is disposed a plurality of gas-solid contacting devices 10 which may be, for example, centrifugal separators through which the gases and/or vapors are forced for the purpose of separating out entrained catalyst fines, which fines are then returned by one or more dip pipes 13 to the dense phase suspension. The reaction products issue from the reactor through line 14 and are then treated in a manner which will be described presently. It is desired to point out that instead of employing a hindered settling reactor having a dense phase and a dilute phase of catalyst suspension therein, I may employ a high speed reactor wherein the superficial velocity of the gases passing therethrough may be as high as 10 feet per second, whereupon a single phase suspension is formed within the reactor.

Since the reaction between carbon monoxide and hydrogen to form hydrocarbons and oxygenated hydrocarbons is highly exothermic, it is necessary to abstract heat from the reactor, and to accomplish this, I provide a cooling means of some sort 16, which may be, for example, an ordinary tubular heat exchanger, through which is forced a cooling medium, such as "Dowtherm" or water, in heat exchange relationship with the catalyst in the reaction zone.

Referring again to the crude products in line 14 withdrawn from reactor 1, the same are passed through a cooling zone 20 where they are cooled to a temperature of, say, 100 to 150° F. whereby water and normally liquid hydrocarbons are condensed and withdrawn through a line 25 and delivered to equipment (not shown) for the purpose of recovering desired products, such as the normally liquid hydrocarbons, including gasoline and gas oil, and the oxygenated hydrocarbons, such as the alcohols, ketones, etc. Since the recovery of the formed hydrocarbon products and the oxygenated hydrocarbon products does not go to the essence of my invention and since the purification and recovery of these substances is known to the prior art, for simplicity I have omitted a showing of the purification equipment and a description in words thereof. The gaseous components of the reaction products are withdrawn from the cooling zone 20 through a line 30 and may be delivered to an oil scrubber 32 where they are treated with an oil, such as gas oil, under known conditions to dissolve hydrocarbon material out of the gases and vapors. The gases stripped of hydrocarbon material are then withdrawn through a line 35 and a portion of these is rejected from the system through line 36. However, another portion of these gases and vapors is conveyed via line 37 to the secondary reactor 2.

It will be found in carrying out my process that from 80 to 99 per cent of the carbon monoxide fed to the primary reactor is converted under the conditions prevailing therein which I shall now disclose. The temperature maintained in reactor 1 for this degree of conversion is 550 to 750° F., the pressure being from 125 to 750 pounds per square inch, preferably 250 to 400 pounds per square inch, and the feed rate being from 20 to 200 volumes of feed gas per pound of iron present in the reactor per hour. The amount of catalyst present in the reactor, which fixes the ratio of feed to catalyst in the reactor, is dependent upon the type and activity of the catalyst employed. It (the amount of catalyst in the reactor) is adjusted to give the desired conversion in the operating range of 80 to 99 per cent of carbon monoxide fed to the reactor in the fresh feed. In other words, with a fixed gas feed to the reactor 1 under the conditions of temperature and pressure as disclosed herein, the degree of conversion is controlled by changing the quantity of catalyst in the reactor. If the dense phase suspension of a catalyst of unknown activity amounted to 30 feet from G to L and it were found that a greater degree of conversion, say, 95 per cent, was being obtained than the desired degree, say about 90 per cent, of the carbon monoxide charged because the catalyst was more active than anticipated, then the degree of conversion in reactor 1 is lowered by decreasing the quantity of catalyst in the reactor, which in the instance cited would amount to lowering the upper dense phase level L, say, 10 to 15 feet. Of course, the degree of conversion could be lowered by other known means such as by increasing the feed rate of reactants, i. e., lowering the contact time in the reactor, or reducing the temperature.

As stated, the gas in 37 is returned for further treatment but, according to my invention, it is returned principally to the secondary reactor 2 containing also a quantity of catalyst preferably in the form of a dense phase suspension extending from the screen or grid $G_2$ to the upper dense phase level $L_2$, the catalyst being procured in the form of a dense phase suspension and an upper dilute phase in precisely the same manner as that described in connection with the operation of primary reactor 1. The gas entering the secondary reactor 2 will contain hydrogen, carbon monoxide, and carbon dioxide primarily, and the ratio of hydrogen to carbon monoxide will be of the order of 2 to 20 mols of hydrogen per mol of carbon monoxide, and the ratio of carbon dioxide to the carbon monoxide will be in the order of 5 to 10 times the volume of carbon monoxide present. The ratios of hydrogen and carbon dioxide to the carbon monoxide will depend on control of several variables as the ratio of hydrogen to carbon monoxide in the fresh feed, the degree of conversion of the carbon monoxide, the amount of recycle from line 37 to reactor 1 and the addition of water to reactor 1. The latter two items will be discussed later. For a 2 to 1 hydrogen to carbon monoxide feed ratio, a 95 per cent conversion of carbon monoxide, no recycle of gas to reactor 1 and no water added to reactor 1, the hydrogen to carbon monoxide ratio will be about 12 and the carbon dioxide to carbon monoxide ratio will be 51.

Some water may be added to stream 37 through line 39 to aid in repressing carbon formation in reactors 1 and 2, the water serving to maintain a higher hydrogen partial pressure in the reactor and to alter the character of the catalyst so that carbon is not formed and laid down on the catalyst in substantial quantities. The amount of gas vented via line 36, which controls the amount of gas in line 37, is fixed so that the volumetric ratio of the quantity of gas in line 37 to the fresh feed gas in line 5 is in the range of 0.2 to 4.0.

In the reactor 2 the superficial velocity of the gas flowing therethrough is of the same order as that in reactor 1 but in reactor 2 the temperature may be as much as 100 to 150° higher than in the reactor 1 and the quantities of gas and catalyst are such in reactor 2 as to give a volume of gas per pound of iron per hour from one-half to one-tenth that employed in reactor 1, the volume being measured at standard temperature and pressure conditions in both instances. The pressures are maintained in both reactors at essentially the same value. The products issue from the upper portion of reactor 2 after passing through one or more gas-solids contacting devices 40 to separate catalyst fines, pass through a drawoff line 43, discharge into line 14, where they are mixed with the products from reactor 1 and are delivered therewith to the cooling and recovery systems. The products from reactor 2 may also be withdrawn, all or in part, thru line 21 to a cooling and recovery system similar to 30 and 32.

Catalyst passes from reactor 1 through a drawoff valved pipe 50 by natural flow into reactor 2. The drawoff pipe 50 is preferably provided with gas leads (not shown) for the purpose of introducing a fluidizing gas so as to promote ready flowability by natural flow of catalyst from the reactor 1 to reactor 2. Catalyst is withdrawn from reactor 2 by drawoff pipe 52 similar to 50 and mixed with a portion of the fresh feed in line 5a to form a suspension which is then conducted pneumatically through line 55 into the bottom of reactor 1. A portion of the recycle gas in line 37 may be withdrawn through line 37a as a substitute for a portion or all of the fresh feed in line 5a in order to provide a conveying medium for the catalyst returning from reactor 2 to reactor 1. This operation also gives recycle of gas in line 37 to reactor 1 to control reaction conditions therein. This gas may be in the order of 0.01 to 2.0 times the volume of gas in line 5. If desired, the gasiform material in line 30 may be by-passed around the oil scrubber 32 and recycled directly via line 37b and 37 to reactor 2. Another modification of my invention involves withdrawing a portion of the fresh feed in line 5 and conducting it via line 5a and line 37a into line 37 for ultimate discharge into secondary reactor 2.

One of the primary advantages of this invention is the greater conversion of the feed, i. e., the carbon monoxide and hydrogen, to a normally liquid hydrocarbon product. It has been previously claimed that the water gas shift reaction equilibrium $$\frac{(CO_2)(H_2)}{(CO)(H_2O)} = K$$

was attained with an iron type catalyst in the temperature range specified. This equilibrium equation is such that if 95 per cent of the carbon monoxide is converted to hydrocarbons and carbon dioxide, for a recycle of 0.25 volume carbon dioxide per volume of carbon monoxide plus hydrogen fresh feed, the conversion of hydrogen would be 65 per cent for a fresh feed ratio of 2 parts of hydrogen to 1 part of carbon monoxide by volume. If the conversion of carbon monoxide were increased to 97 per cent by increasing the amount of catalyst in the reactor, the conversion of hydrogen would then become 72 per cent. Again, if the conversion of carbon monoxide were further increased to 99.5 per cent, the conversion of hydrogen would be 92 per cent. It is apparent from these figures why assumption of the water gas shift equilibrium indicated a greater increase in hydrogen conversion than in the carbon monoxide conversion. These changes in conversion of the feed components by the water gas shift reaction were postulated on the same operating conditions of temperature, pressure and recycle ratio. After extensive experimental investigation of the range of carbon monoxide conversions at different feed ratios and operating conditions, it was found by me that the water gas shift equilibrium was not attained and that for a given recycle of hydrogen, carbon monoxide and carbon dioxide, after removal of water and normally liquid hydrocarbons by condensation, the conversion of hydrogen changed hand in hand with the conversion of carbon monoxide. For example, when the conversion of carbon monoxide was increased 10 parts, say, from 89.5 to 99.5 per cent, the conversion of hydrogen was increased 14 parts, from 71 to 85 per cent hydrogen conversion with the same amount of recycle of carbon dioxide, 0.25 volume of carbon dioxide per volume of hydrogen and carbon monoxide in the fresh feed in each case, the basis of comparison being the $CO_2$ content of the recycle gas. Of course, the recycle gas will also contain some $H_2$, CO and perhaps $CH_4$ and other hydrocarbons.

In commercial plants this is of economic importance. In recycling to a commercial plant, $CO_2$, $H_2$, CO and some light hydrocarbons are recycled. For comparative purposes I have based the comparison on the $CO_2$ recycled. High hydrogen conversion cannot be obtained by operating at high carbon monoxide conversions, in the order of 99.5 per cent, as indicated by the water gas shift equation. As stated, experimental data has shown only 85 per cent hydrogen conversion compared to 95 per cent calculated by the water gas shift equilibrium at 600° F. Consequently, with recycle of gas to a single reactor to obtain 93.5 per cent hydrogen conversion with 98 per cent carbon monoxide conversion, a recycle ratio of 1.85 volumes of hydrocarbon free vent gas containing 0.5 volume of $CO_2$ per volume of fresh feed is necessary. With the two-reactor system using 600° F. in the first reactor and 700° F. in the second reactor, this recycle ratio is decreased to 0.3 volume of hydrocarbon free vent gas containing 0.1 volume of $CO_2$ based on carbon monoxide and hydrogen in the fresh feed with a hydrogen to carbon monoxide ratio of 2. This saving of 84 per cent in recycle gas is of economical importance.

A further advantage of the invention is the controlled carbon formation during a reaction when hydrogen conversions above 90 per cent were obtained. In a single reactor at 650° F., 2 to 1 hydrogen to carbon monoxide ratio, 400 pounds per square inch and 40 volumes of feed gas per pounds of catalyst with recycle ratio in the order of 4 volumes of recycle per volume of fresh feed, carbon formation was excessive. For example, in 100 hours the catalyst contained upwardly of 50 pounds of carbon per 100 pounds of catalyst. At the same time, the catalyst was physically disintegrated by the formation of carbon in the lattice of the catalyst so that the percentage of 0 to 20 microns increased from 5 to 75 per cent, a very undesirable condition because with this percentage of catalyst fines, the catalyst losses overhead from the reactor are excessive. On the other hand, it was found that when the conversion of hydrogen was held less than 93 per cent by practically eliminating the recycle to the first reactor, the carbon formation was decreased to an operable range and catalyst disintegration was avoided. Also, carbon formation in the secondary reactor was found to be negligible because of the high partial pressure of hydrogen present in this reactor.

The invention is not limited to the specific details hereinbefore set forth. For example, (a) two or more single-pass reactors may be used, (b) the first reactor may have a small amount of recycle vent gas feed thereto and the second reactor may be once through, and (c) the first reactor may be once through and the second reactor may use recycle operations. It is also disclosed that successively lower pressures may be used in each reactor, say, 450 pounds per square inch in the first and 250 pounds per square inch in the second. Again, the recovery systems for the different reactors need not be identical, each having its own condensing system. Finally, the reactors need not have a circulating catalyst stream; in fact, different catalysts may be used in each reactor.

As hereinbefore used, the term "recycle gas" refers to the normally gaseous portion of the product from which hydrocarbons have been at least partially removed.

Numerous modifications of my invention may be made by those familiar with the art without departing from the spirit thereof.

What I claim is:

1. The method of synthesizing hydrocarbons which comprises feeding a mixture containing hydrogen and carbon monoxide in the ratio of about 2 mols of hydrogen per mol of carbon monoxide to a reaction zone containing a bed of fluidized powdered iron catalyst, maintaining a temperature in the said reaction zone of from about 600°–700° F., maintaining a pressure in said reaction zone of from 400–450 p. s. i., limiting the degree of hydrogen conversion not to exceed 90% by causing the reactants to flow through the reaction zone at a space velocity of from 10–200 volumes of feed gas per pound of catalyst per hour and including added water in the feed, whereby carbonaceous material is deposited on said catalyst, withdrawing the crude reaction products and unconverted synthesis gas from the reaction zone, cooling the product to condense water and at least a major portion of the normally liquid hydrocarbons, delivering uncondensed gases containing hydrogen, carbon monoxide and carbon dioxide in the ratio of about 2 to 20 volumes of hydrogen per volume of carbon monoxide and 5 to 10 volumes of carbon dioxide per volume of carbon monoxide and vapors with fresh feed to a second reactor containing a bed of fluidized iron catalyst, passing at least a portion of said carbon-containing catalyst from said primary reaction zone to said second reaction zone, maintaining a temperature in the said second reaction zone from 100°–150° F. higher than that prevailing in the first named reaction zone reacting said carbon dioxide with said carbon-contaminated catalyst in said second reaction zone whereby the carbon content of said catalyst in said second reaction zone is reduced to a value substantially below the carbon content on catalyst in said primary reaction zone and whereby a substantial portion of said carbon dioxide is converted to carbon monoxide in said second reaction zone, maintaining further hydrocarbon synthesis in said second reaction zone with carbon monoxide present in said feed to said zone and CO formed as a result of interaction of carbon dioxide in said feed with said carbon-containing catalyst, permitting the reactants to remain resident in the said second reaction zone for a period of time sufficient to effect conversion to the extent that at least 93% of the total carbon monoxide and hydrogen fed to the system are converted to hydrocarbons and oxygenated hydrocarbons, withdrawing catalyst from said second reaction zone and returning at least a portion of the thus withdrawn catalyst to the first reaction zone.

2. The process of synthesizing hydrocarbons which comprises feeding a gas mixture containing $H_2$ and CO in the ratio of about 1 to 2 mols $H_2$ per mol CO into a primary reaction zone containing a bed of fluidized powdered iron catalyst, maintaining a temperature in said reaction zone of from about 550° to 750° F. and a pressure from about 250 to about 450 p. s. i., passing said reactants through said reaction zone at a space velocity of from about 10 to 200 volumes of feed gas per pound of catalyst per hour whereby carbonaceous solids are deposited on said catalyst, withdrawing crude reaction products and unconverted synthesis gas from said primary reaction zone, cooling said withdrawn products to condense water and at least a major portion of normally liquid hydrocarbons, passing tail gas comprising uncondensed gases and vapors to a second hydrocarbon synthesis reaction zone, said tail gas containing substantial proportions of carbon dioxide, passing at least a portion of said carbon-containing catalyst from said primary reaction zone to said second reaction zone, maintaining a fluidized bed of said iron catalyst in said second reaction zone, maintaining a temperature in said second reaction zone of from 100° to 150° higher than that prevailing in said first-named reaction zone, reacting said carbon dioxide with said carbon-contaminated catalyst in said second reaction zone whereby the carbon content of said catalyst in said second reaction zone is reduced to a value substantially below the carbon content in said primary reaction zone and whereby a substantial portion of said carbon dioxide is converted to carbon monoxide in said second reaction zone, maintaining further hydrocarbon synthesis reaction in said second zone with carbon monoxide present in said feed to said zone and CO formed as a result of interaction of carbon dioxide with said carbon-containing catalyst, permitting the reactants to remain resident in said second reaction zone for a period of time sufficient to effect conversion to the extent that at least 93% of the total carbon monoxide and hydrogen fed to the system is converted to hydrocarbons and oxygenated hydrocarbons, withdrawing catalyst from said second reaction zone and returning at least a portion of the thus withdrawn catalyst to the first reaction zone.

3. The process of claim 2 wherein said tail gas fed to said second hydrocarbon synthesis zone comprises hydrogen, carbon monoxide and carbon dioxide and wherein the $H_2/CO$ ratio is from about 2–20/1 and wherein the $CO_2/CO$ ratio is from about 5–10/1.

CHARLES E. HEMMINGER.

REFERENCES CITED

The following references are of record in the file of this patent:

UNITED STATES PATENTS

| Number | Name | Date |
|---|---|---|
| 2,149,515 | Fischer | Mar. 7, 1939 |
| 2,178,824 | Atwell | Nov. 7, 1939 |
| 2,256,622 | Murphree | Sept. 23, 1941 |
| 2,409,235 | Atwell | Oct. 15, 1946 |
| 2,417,164 | Huber, Jr. | Mar. 11, 1947 |
| 2,451,879 | Scharmann | Oct. 19, 1948 |